United States Patent
Tomida

(10) Patent No.: US 6,628,931 B1
(45) Date of Patent: Sep. 30, 2003

(54) SHORTWAVE RECEIVER AND ANTENNA ADAPTOR

(75) Inventor: Takashi Tomida, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/457,306

(22) Filed: Dec. 9, 1999

(30) Foreign Application Priority Data

Dec. 9, 1998 (JP) .......................................... 10-349788

(51) Int. Cl.[7] .................................................. H04B 1/18
(52) U.S. Cl. ................................ 455/193.1; 455/169.1; 455/168.1; 455/154.1
(58) Field of Search ........................... 455/193.1, 193.3, 455/194.2, 195.1, 197.1, 191.1, 191.3, 192.1, 192.3, 169.1, 168.1, 154.1; 343/741, 742, 866

(56) References Cited

U.S. PATENT DOCUMENTS

| | | | | |
|---|---|---|---|---|
| 4,403,347 A | * | 9/1983 | Iso et al. .................. | 455/193.1 |
| 4,450,588 A | * | 5/1984 | Rohrich et al. .......... | 455/192.1 |
| 5,754,142 A | * | 5/1998 | Wine et al. .................. | 343/744 |
| 6,054,965 A | * | 4/2000 | Yamamoto et al. ......... | 343/860 |

* cited by examiner

*Primary Examiner*—Vivian Chin
*Assistant Examiner*—John J Lee
(74) *Attorney, Agent, or Firm*—Jay H. Maioli

(57) ABSTRACT

A shortwave radio-receiver shows an improved reception sensitivity that can be used in a highly convenient way. The receiver is adapted for the superheterodyne system and the PLL synthesizer system and includes a front end circuit 33A for converting the received shortwave signal into an intermediate frequency signal. It also includes a formation circuit 50 for forming a tuning voltage VMB to be applied to the variable capacity diode of the antenna module and a jack J32. When the antenna module is in use, the formation circuit 50 is controlled in response to the reception frequency of the front end circuit 33A so as to modify the tuning voltage VMB and make the latter correspond to the reception band of the received shortwave broadcast to be received. The tuning voltage VMB is applied from the jack J32 to the variable capacity diode and, at the same time, the received signal is fed to the front end circuit 33A.

6 Claims, 12 Drawing Sheets

|  | METER BAND | FREQUENCY (kHz) | DB3 | DB2 | DB1 | DB0 | Y0~Y5 |
|---|---|---|---|---|---|---|---|
| L BAND | 120m | 1711~2850 | 0 | 0 | 0 | 0 | Y0=1 OTHERS=0 |
|  | 90m | 2851~3650 | 0 | 0 | 0 | 1 | Y1=1 OTHERS=0 |
|  | 75m | 3651~4380 | 0 | 0 | 1 | 0 | Y2=1 OTHERS=0 |
|  | 60m | 4381~5500 | 0 | 0 | 1 | 1 | Y3=1 OTHERS=0 |
|  | 49m | 5501~6680 | 0 | 1 | 0 | 0 | Y4=1 OTHERS=0 |
|  | 41m | 6681~8400 | 0 | 1 | 0 | 1 | Y5=1 OTHERS=0 |
| H BAND | 31m | 8401~10750 | 1 | 0 | 0 | 0 | Y0=1 OTHERS=0 |
|  | 25m | 10751~12830 | 1 | 0 | 0 | 1 | Y1=1 OTHERS=0 |
|  | 22m | 12831~14450 | 1 | 0 | 1 | 0 | Y2=1 OTHERS=0 |
|  | 19m | 14451~16580 | 1 | 0 | 1 | 1 | Y3=1 OTHERS=0 |
|  | 16m (15m) | 16581~20280 | 1 | 1 | 0 | 0 | Y4=1 OTHERS=0 |
|  | 13m (11m) | 20281~29999 | 1 | 1 | 0 | 1 | Y5=1 OTHERS=0 |

FIG.5

| | METER BAND | FREQUENCY (kHz) | DB4 | DB3 | DB2 | DB1 | DB0 | $\overline{Y0}\sim\overline{Y11}$ |
|---|---|---|---|---|---|---|---|---|
| L BAND | 120m | 1711~2850 | 0 | 0 | 0 | 0 | 0 | $\overline{Y0}$=0 OTHERS=1 |
| | 90m | 2851~3650 | 0 | 0 | 0 | 0 | 1 | $\overline{Y1}$=0 OTHERS=1 |
| | 75m | 3651~4380 | 0 | 0 | 0 | 1 | 0 | $\overline{Y2}$=0 OTHERS=1 |
| | 60m | 4381~5500 | 0 | 0 | 0 | 1 | 1 | $\overline{Y3}$=0 OTHERS=1 |
| | 49m | 5501~6680 | 0 | 0 | 1 | 0 | 0 | $\overline{Y4}$=0 OTHERS=1 |
| | 41m | 6681~8400 | 0 | 0 | 1 | 0 | 1 | $\overline{Y5}$=0 OTHERS=1 |
| H BAND | 31m | 8401~10750 | 1 | 0 | 1 | 1 | 0 | $\overline{Y6}$=0 OTHERS=1 |
| | 25m | 10751~12830 | 1 | 0 | 1 | 1 | 1 | $\overline{Y7}$=0 OTHERS=1 |
| | 22m | 12831~14450 | 1 | 1 | 0 | 0 | 0 | $\overline{Y8}$=0 OTHERS=1 |
| | 19m | 14451~16580 | 1 | 1 | 0 | 0 | 1 | $\overline{Y9}$=0 OTHERS=1 |
| | 16m (15m) | 16581~20280 | 1 | 1 | 0 | 1 | 0 | $\overline{Y10}$=0 OTHERS=1 |
| | 13m (11m) | 20281~29999 | 1 | 1 | 0 | 1 | 1 | $\overline{Y11}$=0 OTHERS=1 |

FIG.10

SHORTWAVE RECEIVER AND ANTENNA ADAPTOR

BACKGROUND OF THE INVENTION

1. Field of the Invention

This invention relates to a shortwave receiver and an antenna adaptor to be used for such a shortwave receiver.

2. Prior Art

Known shortwave receivers include those adapted to be connected to an external antenna, which may be a wire antenna or a rod antenna.

While a wire antenna is simply a wire that may be a lead wire and can only transfer the signal it receives to the receiver, it can show a satisfactory sensitivity when it has a sufficient length. A rod antenna can also show a satisfactory sensitivity when combined with a high frequency amplifier to make itself an active type antenna.

However, a wire antenna has no tuning effect and transfers any signal it receives regardless if the signal is a broadcast wave signal to be received properly by the receiver or not and hence is disadvantageous in terms of anti-jamming performance.

A rod antenna, on the other hand, will be short of sensitivity if combined with a high frequency amplifier when it is short and down-sized. A rod antenna showing a satisfactory level of sensitivity is inevitable rather long and large. Additionally, a rod antenna lacks directivity and is hence disadvantageous also in terms of anti-jamming performance.

In an attempt for bypassing the above identified problems, loop antennas have be used as external antennas. Since a loop antenna is basically a coil and hence of a tuning type, it has to be adapted to make its tuning frequency variable when used to receive shortwave broadcast signals over a wide frequency range.

Therefore, a loop antenna is normally connected to a tuning capacity element to form a tuning circuit, the capacity thereof being made variable for different meter bands (reception bands) to be used for signal reception. Then, it is provided with a high frequency amplifier that operates also as an output buffer so that the output signal of the tuning circuit is transmitted to the receiver by way of the high frequency amplifier.

Thus, a loop antenna can show a satisfactory level of sensitivity if it is down-sized. Additionally, it can be made to show a good anti-jamming effect because of its directivity and tuning ability. Still additionally, it can cover a wide frequency range as its tuning frequency is variable.

However, a loop antenna has to be operated in a cumbersome way to modify its tuning frequency in order to make itself adapted to a specific meter band.

Additionally, if the user of a shortwave receiver/recorder wants to sequentially record a plurality of broadcast programs transmitted in different respective meter bands by utilizing the automatic recording feature of the recorder that is provided with a timer, lie or she can record only the first program because the loop antenna is not adapted to tune in the transmission frequency of the second program. If the receiver/recorder has a memory scanning feature (a feature with which the receiver can sequentially receive programs of the transmission frequencies stored in the memory in advance), the feature is useless unless the tuning frequency of the loop antenna is correctly modified.

Therefore, the object of the present invention is to provide a shortwave receiver and an antenna adaptor that can bypass the above problem.

SUMMARY OF THE INVENTION

According to the invention, the above object is achieved by providing a shortwave receiver adapted to be used with an antenna module having:

a loop antenna;

a variable capacity diode connected in parallel to the loop antenna to form a tuning circuit for high frequency tuning operations; and a high frequency amplifier for receiving the signal to be received selected by said tuning circuit;

said shortwave receiver comprising:

a receiving circuit for receiving the shortwave broadcast signal output from said antenna module;

a formation circuit for forming a tuning voltage to be applied to said variable capacity diode; and a jack;

when using said antenna module, said forming circuit being controlled corresponding to the reception frequency of said receiving circuit so as to modify said tuning voltage to accommodate the meter band of the shortwave broadcast received by said receiving circuit and cause said tuning voltage to be output from said jack and applied to said variable capacity diode.

According to the invention, there is also provided an antenna adaptor to be used with an antenna module having:

a loop antenna;

a variable capacity diode connected in parallel to the loop antenna to form a tuning circuit for high frequency tuning operations; and a high frequency amplifier for receiving the signal to be received selected by said tuning circuit;

and a shortwave receiver having:

a receiving circuit for receiving the shortwave broadcast signal output from said antenna module;

a formation circuit for forming a tuning voltage to be applied to said variable capacity diode; and a jack;

said antenna module comprising:

a battery for supplying power to said high frequency amplifier;

a switching means for turning on/off the output voltage of said battery;

a plug adapted to be plugged into said jack; and a cable connected to said plug;

when using said antenna module, said forming circuit being controlled corresponding to the reception frequency of said receiving circuit so as to modify said tuning voltage to accommodate the meter band of the shortwave broadcast received by said receiving circuit;

said switching means being turned on to apply the output voltage of said battery to said high frequency amplifier as operating voltage;

said tuning voltage being applied from said jack to said variable capacity diode by way of said plug and said cable;

the received signal output from said antenna module being supplied to said reception circuit by way of said cable and said plug.

Thus, according to the invention, when the reception frequency of the receiver is modified, the tuning frequency of the tuning circuit comprising a loop antenna is automatically modified accordingly so that the shortwave broadcast to be received can be tuned in with an enhanced level of sensitivity. Additionally, since the tuning circuit is used to provide the loop antenna with a selectivity for reliably detecting the reception frequency of the broadcast, no unnecessary and undesired broadcast wave signals are fed to the downstream to improve the anti jamming effect of the antenna. Still additionally, the anti-jamming effect of the loop antenna can be improved further by exploiting its directivity.

As the reception frequency of the receiver is shifted, the tuning frequency of the tuning circuit comprising the loop antenna is automatically modified to make the user free from the need of operating the loop antenna and provide him or her with an improved level of convenience.

When, the user wants to sequentially record a plurality of broadcast programs transmitted in different respective meter bands by means of a recorder, utilizing the automatic recording feature of the recorder that is provided with a timer, he or she can record the second and subsequent programs. If the receiver/recorder has a memory scanning feature (a feature with which the receiver can sequentially receive programs of the transmission frequencies stored in the memory in advance), the feature can be exploited by effectively using the loop antenna. Finally, since the receiving antenna is a loop antenna., it can be down-sized and made to show a high reception sensitivity if compared with a rod antenna or a wire antenna.

BRIEF DESCRIPTION OF THE DRAWINGS

FIG. 5 is a chart to be used for describing the present invention.

FIG. 10 is another chart to be used for describing the present invention.

DETAILED DESCRIPTION OF THE INVENTION

Outline

The second column in the chart of FIG. 5 shows the twelve meter bands ranging from the 120 meter band and the 13 meter band (including the 11 meter band) that the loop antenna of the radio receiver to be described below is adapted to accommodate.

Since it is highly difficult for a single loop antenna to accommodate such a large number of meter bands, the twelve meter bands are divided into two groups so that the first group (to be referred to as L bands hereinafter) ranging from the 120 meter band to the 41 meter band and the second group (to be referred to as H bands hereinafter) ranging from the 31 meter band to the 11 meter band. The L band and the H band are adapted to use respective auxiliary coils that are automatically turned on and off so that a specific meter band may be selectively tuned in.

Figure 1:
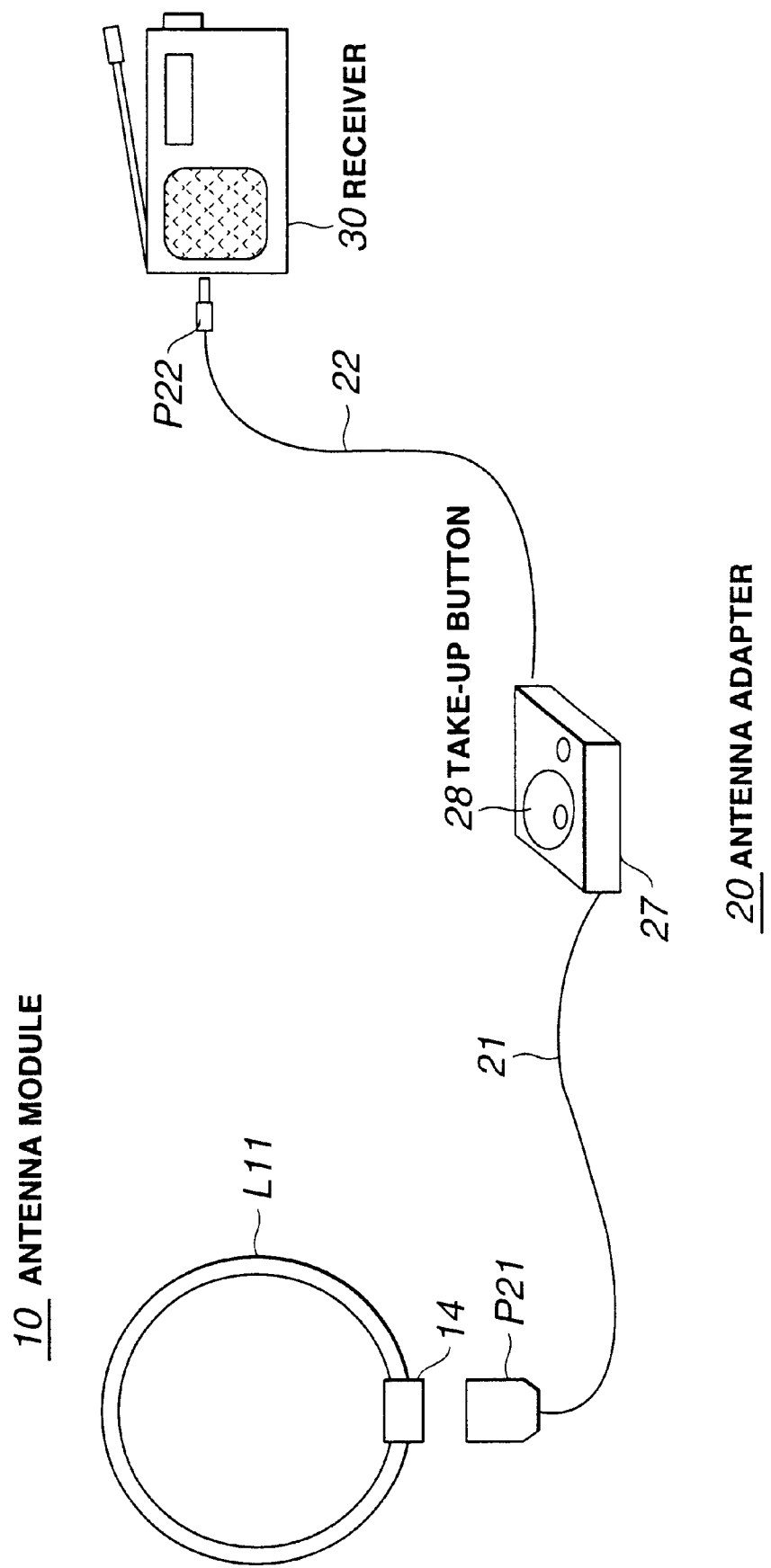
FIG. 1 is a schematic diagrammatical illustration of an embodiment of the present invention.

FIG. 1 is a schematic diagrammatical illustration of an embodiment of the present invention comprising an antenna module 10, antenna adaptor 20 and a radio receiver 30, of which the antenna adaptor 20 has a loop antenna L11 provided as integral part thereof with a cabinet 14 that contains a tuning capacity element and a high frequency amplifier.

The antenna adaptor 20 also has a cabinet 27 that contains a circuit for carrying out auxiliary processing operations for the circuits of the antenna module 10 and also a battery for supplying power thereto. The antenna adaptor 20 additionally has connection cables 21, 22 and connector plugs P21, P22 along with a button 28, which is linked to a reel (not shown) contained in the cabinet so that the cables 21, 22 are taken up by the reel as the button 28 is operated.

The receiver 30 is designed to operate both as superheterodyne receiver and as PLL synthesizer and has a connection circuit to be used for connecting an external antenna to the receiver 30 for receiving a shortwave broadcast. Thus, the receiver is adapted to receive a broadcast in any of the above shortwave broadcast meter bands and FM broadcasts.

For receiving a shortwave broadcast by means of the antenna module 10 and the antenna adaptor 20, firstly the plugs P21 and P22 are plugged respectively into the jack (not shown) of the antenna adaptor 10 and into the external antenna jack (not shown) of the receiver 30. The loop antenna L11 is normally arranged at a position good for receiving radio-waves that may be found at a window side.

As the receiver 30 is operated for tuning, the reception frequency to be detected by the receiver 30 is selected and, at the same time, the tuning voltage is applied to the antenna module 10 from the receiver 30 by way of the antenna adaptor 20 and the meter band corresponding to the tuning frequency of the antenna module 10 is selected for the receiver 30. Then, the signals received by the loop antenna L11 and found within the selected meter band are fed to the receiver 30 by way of the antenna adaptor 20 so that the user can listen to the broadcast transmitted with that frequency.

Configuration and Operation of Receiver 30

Figure 4:
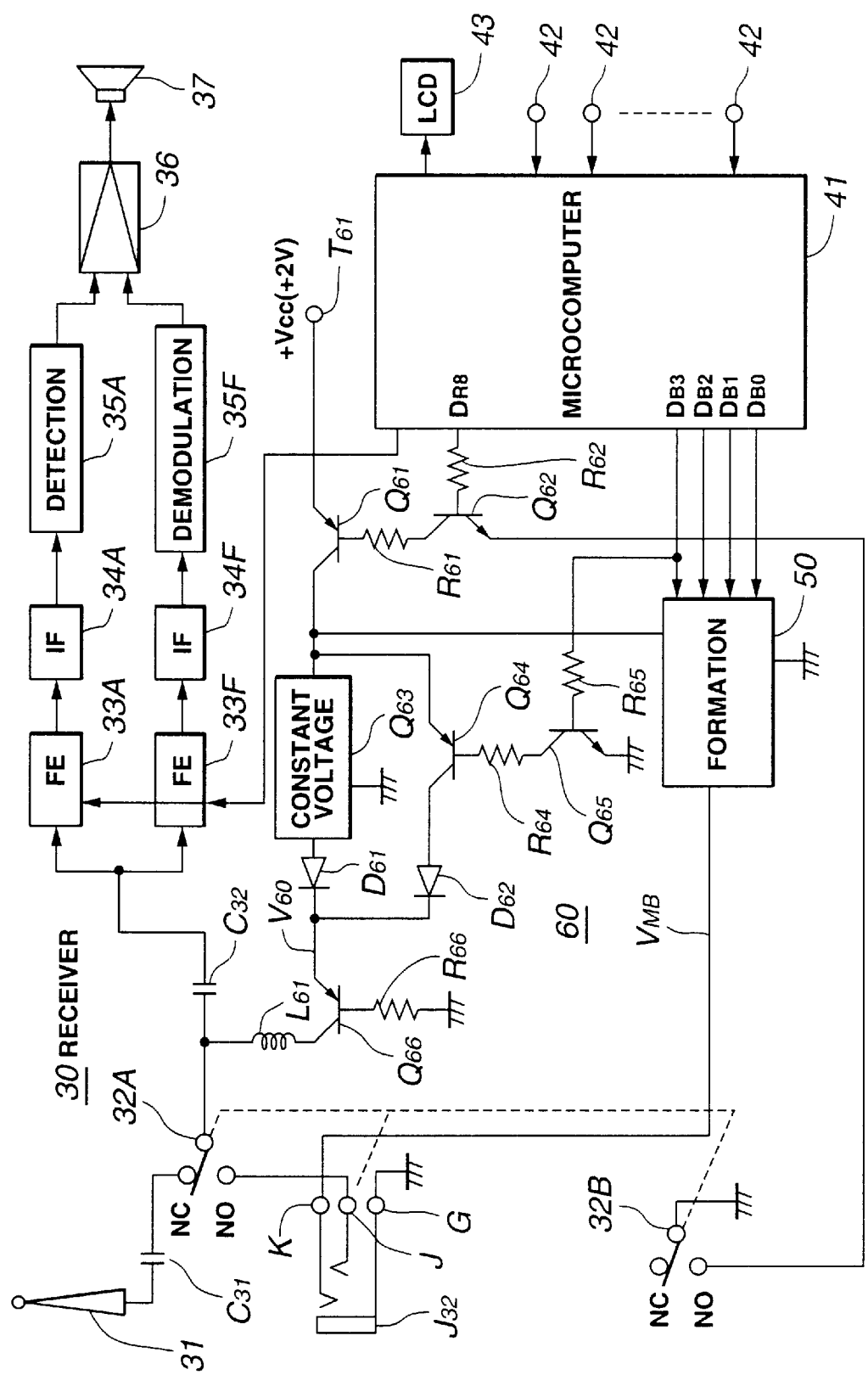
FIG. 4 is a schematic circuit diagram of still another part of the embodiment of FIG. 1.

FIG. 4 shows a typical configuration that can be used for the receiver 30. When the antenna module 10 and the antenna adaptor 20 are not used, the receiver 30 uses rod antenna 31 for receiving shortwave broadcast signals or FM broadcast signals and the received signals are fed to front end circuits 33A, 33F by way of the signal line formed by capacitor C31→contact NC of switch 32A→capacitor C32.

The switch 32A is interlocked with external antenna jack J32 for switching operations. The front end circuit 33A is used for receiving shortwave broadcasts, whereas the front end circuit 33F is used for FM broadcasts. Although not shown, the front end circuits 33A, 33F have a high frequency tuning circuit, a mixer circuit, a local oscillation circuit and other circuits for realizing a superheterodyne system. The local oscillation circuit is constituted by the VCO of a PLL synthesizer.

The receiver 30 additionally comprises a microcomputer 41 operating as system controller, to which various operation keys 42 and a display are connected. The display may be an LCD 43. As a station is selected by means of the keys 42, a control signal (data on the frequency dividing ratio of the PLL) corresponding to the key operation is generated and transmitted to the front end circuit 33A or 33F to pick up the broadcast wave signal of the selected frequency, which signal is then subjected to frequency conversion to make it show an intermediate frequency.

When receiving a shortwave broadcast, the intermediate frequency of the picked up shortwave broadcast is taken out from the front end circuit 33A and fed to detection circuit 35A by way of intermediate frequency circuit 34A having an intermediate frequency filter and an amplifier, which detection circuit 35A by turn picks up the audio signal from the intermediate frequency signal and feeds loudspeaker 37 with the audio signal by way of amplifier 36.

On the other hand, when receiving an FM broadcast, the intermediate frequency of the picked FM broadcast is taken out from the front end circuit 33F and fed to detection circuit 35F by way of intermediate frequency circuit 34F having an intermediate frequency filter and a limiter amplifier, which detection circuit 35F by turn picks up the audio signal from the intermediate frequency signal and feeds the loudspeaker 37 with the audio signal by way of the amplifier 36.

The antenna connection circuit is configured in a manner as described below in order to effectively utilize the antenna module 10. A so-called stereo mini-jack J32 of the type that is popularly used for head phones is typically used for the external antenna jack connected to the plug P22 of the antenna adaptor 20 and interlocked with the switch 32A as pointed out above.

One of the contacts of the jack J32, contact J, is connected to contact NO of the switch 32A and common contact G of the jack J32 is grounded. Then, 4-bit band data DB3 through DB0 that vary as a function of the meter band to be selected for signal reception in a manner as shown in FIG. 5 are taken out from the microcomputer 41 and fed to tuning voltage forming circuit 50 to form tuning voltage VMB. The tuning voltage VMB is the voltage required to make the receiver 30 to tune in the central frequency of each of the meter bands. The voltage VMB is applied to the other contact K of the jack J32.

There is also provided a terminal T61 to which predetermined DC voltage +VCC (e.g., VCC=2V) is applied. The terminal T61 is connected to the emitter of transistor Q61 operating as switch. The collector of the transistor Q61 is connected to the input terminal of IC (Q63) for supplying a constant voltage and the emitter of transistor Q64.

The IC (Q63) and the transistor Q64 constitute a voltage switch circuit 60, where the output terminal of the IC (Q63) and the collector of the transistor Q64 are connected to the emitter of current limiting transistor Q66 by way of reverse-current blocking transistor Q66. The base of the transistor Q64 is connected to the collector of transistor Q65 by way of drive transistor Q65 and the emitter of the transistor Q64 is grounded. The band data DB3 is fed to the base of the transistor Q64 by way of resistor R65. The output voltage of the IC (Q63) is typically made to be equal to 1.5 V. The voltage appearing at the connection point of elements D61, D63 and Q66 is referred to as V60.

The collector of the transistor Q66 is connected to the master contact of the switch 32A by way of high frequency choke coil L61 and the base of the transistor Q66 is grounded by way of resistor R66.

Also, reception band data DRB that is equal to "1" when receiving a shortwave broadcast and equal to "0" when receiving an FM broadcast is taken out from the microcomputer 41 and fed to the base of the transistor Q62 by way of resistor R62. The connector of the transistor Q62 is connected to the base of the transistor Q61 by way of resistor R61 and the emitter of the transistor Q62 is connected to the contact NO of switch 32B, which is also interlocked with the jack J32 and whose master contact is grounded. As a DC voltage is output to the collector of the transistor Q61, it is also applied to the formation circuit 50 as operating voltage thereof.

With the above arrangement, as the plug P22 is plugged into the jack J32, the switches 32A, 32B are connected to the contact NO, although FIG. 4 shows the connection differently.

As the power source of the receiver 30 is turned on, the DC voltage +VCC is applied to the terminal T61 and, if the shortwave broadcast reception mode is selected at this time, the reception band data DRB band data DRB output from the microcomputer 41 becomes equal to "1". Thus, the transistor Q62 is turned on and subsequently the transistor Q61 is turned on so that the DC voltage +VCC at the terminal T61 is applied to the input terminal of the IC (Q63) and the emitter of the transistor Q64 by way of the transistor Q61.

If the reception frequency falls in one of the meter bands of the L band, the reception band data DB3 output from the microcomputer 41 becomes equal to "0". Thus, the transistor Q65 is turned off and subsequently the transistor Q64 is turned off so that the output voltage (=1.5V) of the IC (Q63) is taken out as voltage V60 by way of the diode D61, which voltage V60 is then applied to the contact J of the jack J32 by way of the voltage line of transistor Q66→coil L61→switch 32A.

If, on the other hand, the reception frequency falls in one of the meter bands of the H band, the reception band data DB3 output from the microcomputer 41 becomes equal to "1". Thus, the transistor Q65 is turned on and subsequently the transistor Q64 is turned on so that the DC voltage +VCC at the terminal T61 is taken out as voltage V60 by way of the transistor Q64 and the diode D62. Since the voltage output to the emitter of the transistor Q64 is higher than the voltage output from the IC (Q63), the diode D61 is turned off to make the voltage V60 substantially equal to the emitter voltage of the transistor Q64, which is equal to the DC voltage +VCC(=2V).

Then, the voltage V60 is applied to the contact J of the jack J32 as in the case of reception in the L band.

Then, the band data DB3 through DB0 that vary as a function of the meter band containing the reception frequency of the front end circuit 33A as shown in FIG. 5 are taken out from the microcomputer 41 and fed to the formation circuit 50. Therefore, the tuning voltage VMB that corresponds typically to the central frequency of the selected meter band is taken out from the formation circuit 50 and applied to the contact K of the jack J32.

Thus, when the antenna module 10 is connected to the receiver 30 by way of the antenna adaptor 20, the voltage V60 whose level changes between the time of receiving signals in the L band and the time of receiving signals in the H band is applied to the contact J of the jack J32, while the tuning voltage VMB whose level changes as a function of the reception frequency (the meter band to be used for signal reception) is applied to the contact K of the jack J32. Note that the voltage V60 is equal to the output voltage (=1.5V) of the IC (Q6) when receiving signals in L band and equal to the output voltage (=2.0V) of the transistor Q64.

Configuration and Operation of Antenna Adaptor 20

Figure 3:
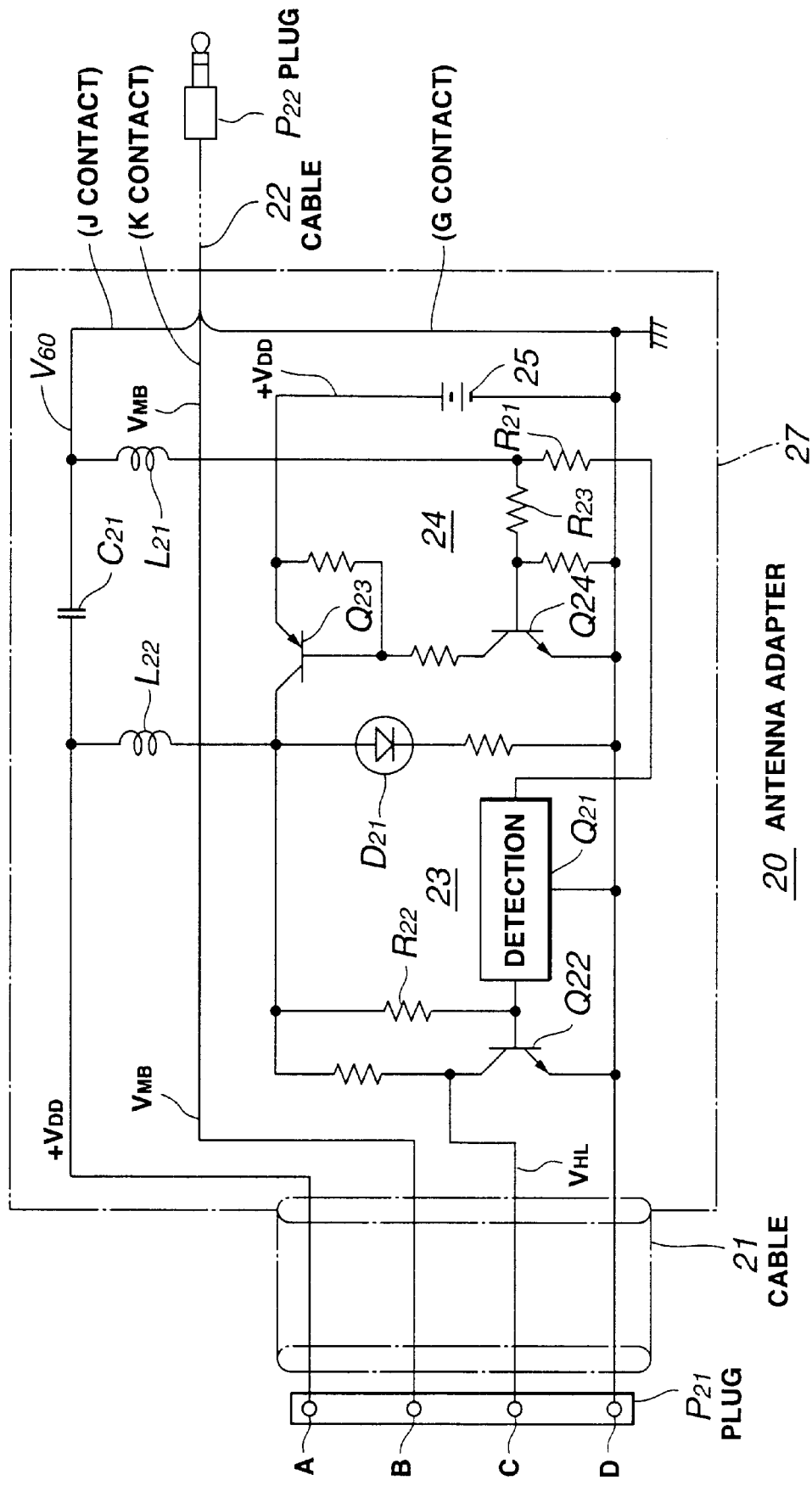
FIG. 3 is a schematic circuit diagram of another part of the embodiment of FIG. 1.

The antenna adaptor 20 typically has a configuration as shown in FIG. 3 and comprises a formation circuit 23 for forming meter band switching voltage VHL and a power supply circuit 24 for applying an operating voltage to the antenna module 10.

Thus, the plug P21 is made to have four contacts A through D and operate as stereo mini-plug corresponding to the jack J32. A voltage detection IC (Q21) is arranged in the formation circuit 23 and one of the contacts of the plug P22 that is connected to the contact J of the jack J32 is also connected to the input terminal of the IC (Q21) by way of the voltage line of cable 22→high frequency choke coil L21→resistor R21.

The IC (Q21) typically operates to use the output voltage of the IC (Q63) of FIG. 4 for the threshold level for voltage detection. Its output terminal is connected to the drain of an internal FET to make its output as that of an open drain. The FET having the open drain is turned on when the applied voltage is lower than the output voltage of the IC (Q63), whereas the FET having the open drain is turned off when the applied voltage is higher than the output voltage of the IC (Q63). A pull-up resistor R22 is connected to the output terminal of the IC (Q21).

Additionally, the power supply circuit 24 is typically provided with a pair of batteries 25 and its output terminal is connected to the power supply line of the formation circuit 23 by way of the emitter/collector of the switching transistor Q23. The connection point of the coil L21 and the resistor R21 is connected to the base of the transistor Q24 whose emitter is grounded and the collector of the transistor Q24 is connected to the base of the transistor Q23. An LED (D21) operating as power supply indicator is connected between the collector of the transistor Q23 and the grounding line of the circuit.

The collector of the transistor Q23 is connected to the contact A of the plug P21 by way of high frequency choke coil L22 and cable 21. Of the contacts of the plug P22, the one that is connected to the contact K of the jack J32 is connected to the contact B of the plug P21 by way of cables 22, 21. A capacitor L21 operating as DC cutter is connected between the coil L22 and the coil L21. Of the contacts of the plug P22, the one that is connected to the common contact G of the jack J32 is connected to the grounding line of the circuit and also connected to the commnon contact (grounding contact) D of the plug P21 by way of cable 21.

As the plug P22 of the antenna adaptor 20 having the above described circuit configuration is plugged into the jack J32, the voltage V60 of the contact J of the jack J32 is applied to the base of the transistor Q24 by way of the voltage line of plug P32→cable 22→coil L21→resistor R23. Thus, the transistor Q23 is turned on as the transistor Q24 is turned on so that the voltage of the battery 25 +VDD is applied to the collector of the transistor Q23.

Then, the voltage +VDD is applied to the contact A of plug P21 by way of the voltage line of coil L22→cable 21. At this time, the LED (D21) is turned on.

The voltage +VDD applied to the collector fo the transistor Q23 is also applied to the formation circuit 23 to activate the latter.

Under this condition, the voltage V60 is also applied to the IC (Q21) from the coil L21 by way of the resistor R21. When the voltage V60 is equal to the output voltage of the IC (Q63) (in the L band reception mode), the open drain of the IC (Q21) is turned on to turn off the transistor Q22 and produce "1" level voltage VHL to the collector of the transistor Q22. Then, the voltage VHL is applied to the contact C of the plug P21 by way of the cable 21.

When, on the other hand, the voltage V60 is equal to the output voltage of the transistor Q64 (in the H band reception mode), the open drain of the IC (Q21) is turned off to turn on the transistor Q22 and produce "0" level voltage VHL to the contact C of the plug P21 by way of the cable 21.

As plug P22 is plugged into the jack J32, the tuning voltage VMB of the contact K of the jack J32 is applied to the contact B of the plug P21 by way of the voltage line of plug P22→cable 22→cable 21.

Thus, when the plug P22 is plugged into the jack J32 of the receiver 30, the voltage +VDD of the battery 25 is applied to the contact A of the plug P21 and the tuning voltage VMB whose level varies as a function of the meter band selected for signal reception is applied to the contact B, while the meter band switching voltage VHL that shows either of two different levels depending on if the L band or the H band is selected for signal reception is applied to the contact C. Note that the voltage VHL is equal to "1" in the L band reception mode and "0" in the H band reception mode.

Configuration and Operation of Antenna Module 10

Figure 2:
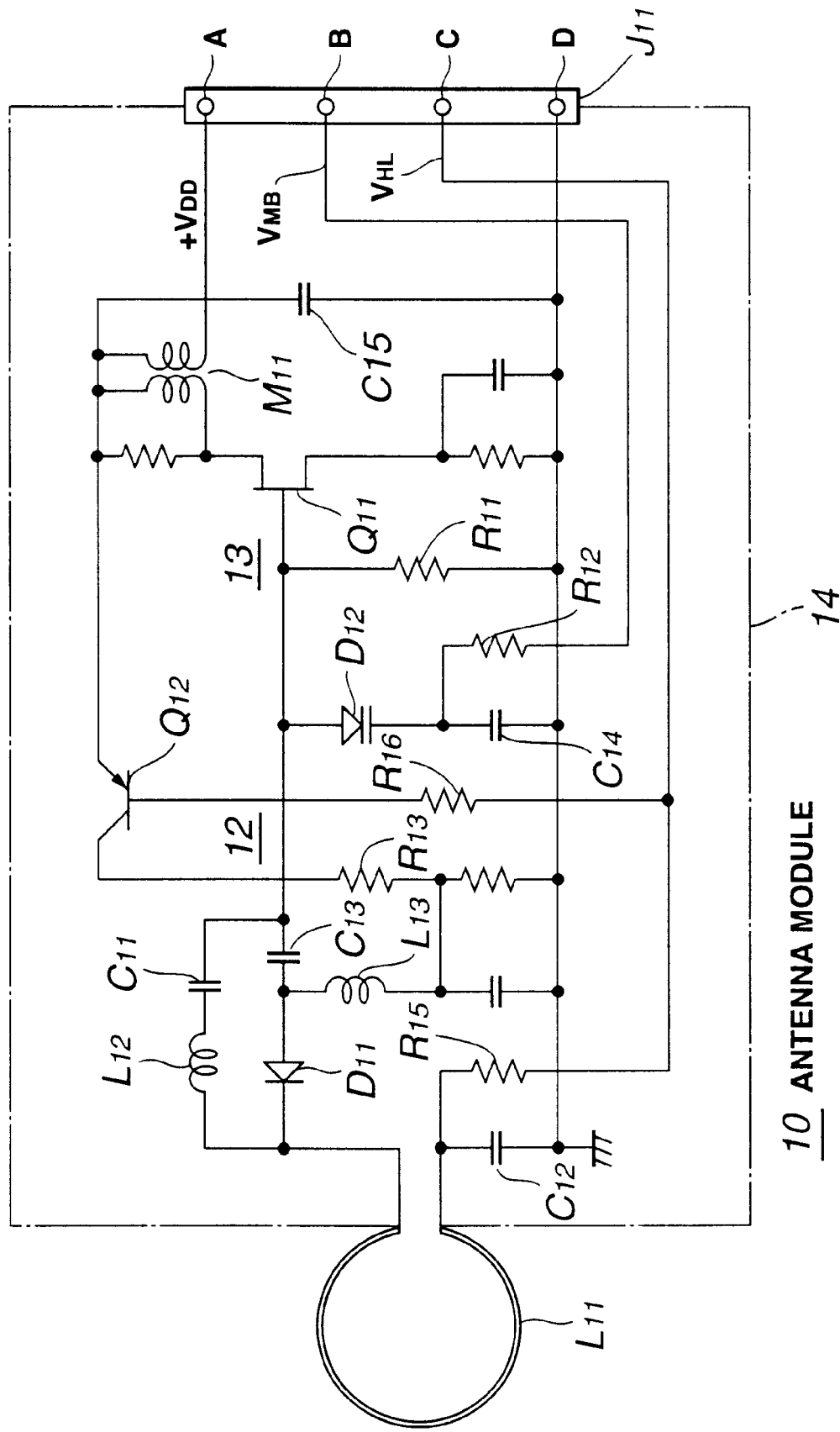
FIG. 2 is a schematic circuit diagram of a part of the embodiment of FIG. 1.

The antenna module 10 typically shows a configuration as schematically illustrated in FIG. 2 and comprises a loop antenna L11 and a high frequency amplifier 13. More specifically, the loop antenna L11 is made of a cord similar to a string of piano that is electrically conductive and flexible or resilient and has a circular profile or the profile of a coil of a single winding with a diameter of 40 cm.

The loop antenna (coil) L11 forms an tuning circuit 12 along with an auxiliary tuning coil 12 and a variable capacity diode D12. More specifically, the loop antenna L11 has one of its end connected to the gate of the FET (Q11) by way of a coil L12 and a DC cutting capacitor C12 and the other end to the grounding contact (common contact) D of the connector jack J11 by way of a bypass capacitor C12. The plug P21 of the antenna module 10 is plugged into the jack J11 for operation and hence the latter has contacts A through D that are to be connected to the contacts A through D of the plug P21 respectively.

A serial circuit comprising a switching diode D11 and a DC cutting capacitor C13 is connected in parallel with the serial circuit of the elements L12 and C11 and the variable capacity diode D12 and DC cutting capacitor C14 are connected in series between the gate of the FET (Q11) and the contact D of the jack J11, while biassing resistor R11 is also connected between the gate of the FET (Q11) and the contact D of the jack J11.

The FET (Q11) operates as component of a high frequency amplifier 13 and its source is grounded while its drain is connected to one of the ends of the primary coil of high frequency transformer M11, the other end of the primary coil being connected to the grounding contact D of the jack J11 by way of the bypass capacitor C15.

The connection point of the primary coil and the secondary coil of the transformer M11 and the capacitor C15 is connected to the emitter of the switching transistor Q12, whose collector is connected to an intermediary point of the elements D11, C12 by way of resistor R13 and high frequency choke coil L13. The contact B of the jack J11 is connected to an intermediary point of the elements D12, C14 by way of buffering resistor R12 and the contact C of the jack J11 is connected to an interimediary point of the elements L11 and C12 by way of buffering resistor R15 and also to the base of the transistor Q12 by way of resistor R16.

The plug P21 is plugged into the jack J11 of the antenna module 10 having the above configuration, the voltage +VDD of the contact A of the plug P21 is applied to the high frequency amplifier 13 by way of the contact A of the jack J11 to make the high frequency amplifier 13 operate.

Additionally, the voltage VHL of the contact C of the plug P21 is applied to the base of the transistor Q12 by way of the voltage line of contact C of jack J11→resistor R16 to turn off the transistor Q12 if VHL ="1" (in the L band reception mode). As a result, no bias voltage is applied to the diode D11 to make it to be turned off.

Thus, the loop antenna L11 and the coil L12 are connected in series to become adapted to high frequency signals and the serial circuit and the variable capacity diode D12 are connected in series to also become adapted to high frequency signals. Then, the parallel circuit comprising those elements is connected between the gate and the source of the FET (Q11). Therefore, the tuning circuit 12 shows a tuning frequency that corresponds to the value defined by the loop antenna L11 and the coil L12 and the value defined by the variable capacity diode D12.

If, on the other hand, VHL ="0" (in the H band reception mode), the transistor Q12 is turned on so that the voltage +VDD being applied to the high frequency amplifier 13 is further fed to the line of an intermediary point between the emitter and the collector of the transistor Q12→resistor R13→coil L13→diode D11→loop antenna L11→resistor R15→contact C of jack J11 (VHL ="0") to turn on the diode D11.

Therefore, the coil L12 is short-circuited by the diode D11 to make the loop antenna L11 and the variable capacity diode D12 connected in series by way of the diode D11 and the capacitors C13, C12, C14 to become adapted to high frequency signals and the serial circuit is then connected between the gate and the source of the FET (Q11). Thus, the tuning circuit 12 shows a tuning frequency that corresponds to the value defined by the loop antenna L11 and the value defined by the variable capacity diode D12.

Thus, the loop antenna L11, the coil L12 and the variable capacity diode D12 constitute the tuning circuit 12 when VHL ="1" (in the L band reception mode), whereas the loop antenna L11 and the variable capacity diode D12 constitute the tuning circuit 12 when VHL ="0" (in the H band reception mode).

Then, the tuning voltage VMB of the contact B of the plug P21 is applied to the variable capacity diode D12 by way of the voltage line of contact B of jack J11→resistor R12→variable capacity diode D12→resistor R11→ground. Thus, the variable capacity diode D12 shows a capacity that matches the tuning voltage VMB.

Therefore, the tuning frequency of the tuning circuit 12 is made typically equal to the central frequency of the meter band containing the reception frequency of the signal to be received by the receiver so that the signals received within the meter band are entirely fed from the tuning circuit 12 to the FET (Q11) and amplified by the latter.

The amplified signals are then taken out to the drain of the FET (Q11) and output to the contact A of the jack J11 by way of the secondary coil of the transformer M11.

Thus, in the antenna module 10, the signals in the meter band that contains the reception frequency of the receiver 30 are received by means of the loop antenna L11 and the tuning circuit 12 and the signal to be received is selected and amplified by the high frequency amplifier 13 before output to the contact A of the jack J11.

Flow of Received Signal

The received signals output to the contact A of the jack J11 is fed to the front end circuit 33A by way of the signal line of contact A of plug P21→cable 21→capacitor C21→cable 22→plug P22→contact J of jack J32→switch 32A→capacitor C32.

Then, as described above, the signal to be received with the selected frequency is singled out from the received signals in the selected meter band by the front end circuit 33A and its frequency is converted into an intermediate frequency and the audio signal is demodulated from the intermediate frequency signal and fed to the loudspeaker 37. Thus, any signal having a selected frequency contained in a selected meter band can be received by means of the loop antenna L11.

Other Operations

When receiving a shortwave broadcast, the switch 32B is connected to the contact NC so long as the plug P22 is not plugged into the jack j32 of the receiver 30. Therefore, the transistor Q62 is held off along with the transistor Q61 regardless of the reception band data DRB output from the mcirocomputer 41.

Thus, the voltage +VCC of the terminal T61 would not be wasted when a shortwave broadcast is received by way of the rod antenna 31 without using the antenna module 10.

When receiving an FM broadcast, on the other hand, the reception band data DBR output from the microcomputer 41 is made equal to "0" to turn off the transistor Q62 and the transistor Q61 so that the voltage +VCC of the terminal T61 would not be wasted either.

When no voltage V60 is applied from the receiver 30 to the plug P22 of the antenna adaptor 20, the transistor Q24 is held off along with the transistor Q23. Therefore, the power source of the antenna module 10 and the antenna adaptor 20 is automatically turned off and the power of the battery 25 would not be wasted when the antenna module 10 and the antenna adaptor 20 are not used or when the plug P22 is plugged into the jack J32 but the power source of the receiver 30 is held off.

Resume

When using the antenna module 10, the antenna adaptor 20 and the receiver 30 as illustrated in FIGS. 1 through 4 are used, the tuning frequency of the loop antenna L11 (tuning circuit 12) is changed by modifying the reception frequency of the receiver 30 so that the shortwave broadcast to be received by the receiver can be successfully received with an enhanced level of sensitivity. Then, due to the tuning circuit 12 showing a wide and acute frequency selectivity, no unnecessary broadcast signals would be transferred to the downstream to improve the anti-jamming effect of the receiver.

As the reception frequency of the receiver 30 is modified, the corresponding band data is selected from the band data DB3 through DB0 accordingly and to change the tuning voltage VMB and the meter band switching VHL, which by turn automatically change the tuning frequency of the loop antenna L11. Thus, the user does not need to operate the antenna module 10 and the antenna adaptor 20 to a great convenience on the part of the user.

When the user wants to automatically record a plurality of broadcasts in different meter bands by means of a timer system, the tuning frequency of the loop antenna L11 is automatically shifted for the second and the subsequent broadcasts so that the user can record any broadcasts in any meter bands by means of the timer system. Additionally, if the receiver is provided with a memory scanning feature, the user can scan the memory by effectively utilizing the antenna module 10.

Additionally, since a loop antenna L11 is used for signal reception, a smaller receiver can be used with a higher reception sensitivity if compared with the instance of using a rod antenna or a wire antenna. Still additionally, the loop antenna L11 may be arranged at a position good for receiving radiowaves that may normally be found at a window side in view of the directivity of a loop antenna.

Figure 6A:
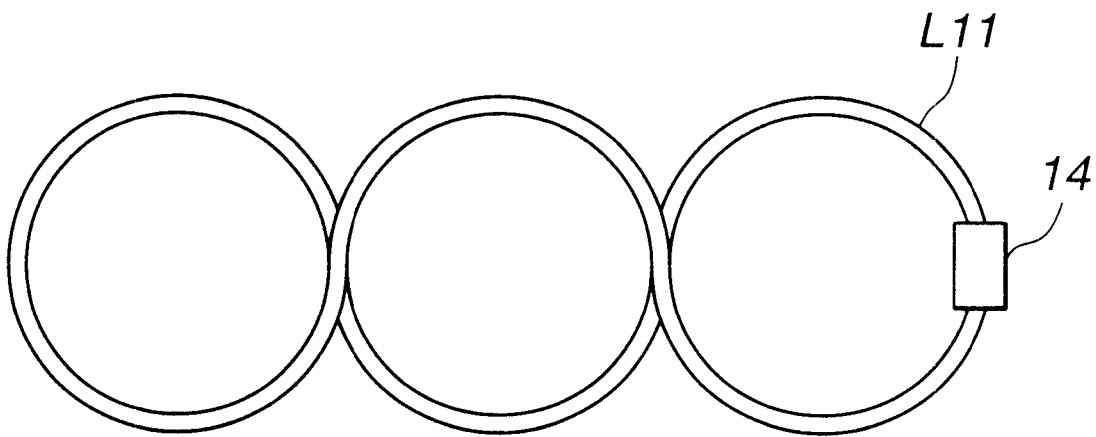
FIG. 6 is an illustration to be used for describing the present invention.
Figure 6B:
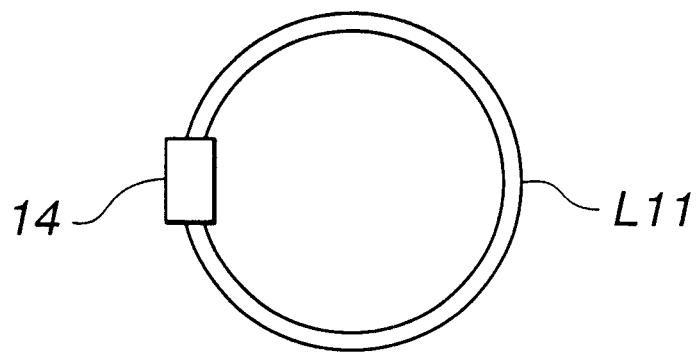

Furthermore, since the loop antenna L11 is made of a flexible or resilient wire similar to a string of piano, it may be twisted into three loops as shown by A in FIG. 6 and then folded to a single small loop as shown by B in FIG. 6 for moving conveniences. Since the plugs P21, P22 can be plugged out from the jacks J11, J32 and the cables 21, 22 can be taken up into the inside of the cabinet 27 by means of the button 28. Thus, the loop antenna L11 can be easily carried with the receiver 30 if the latter is of the portable type.

Finally, no power will be wasted when the antenna module 10 is not in use.

Configuration and Operation of Tuning Voltage Forming Circuit 50

Figure 7:
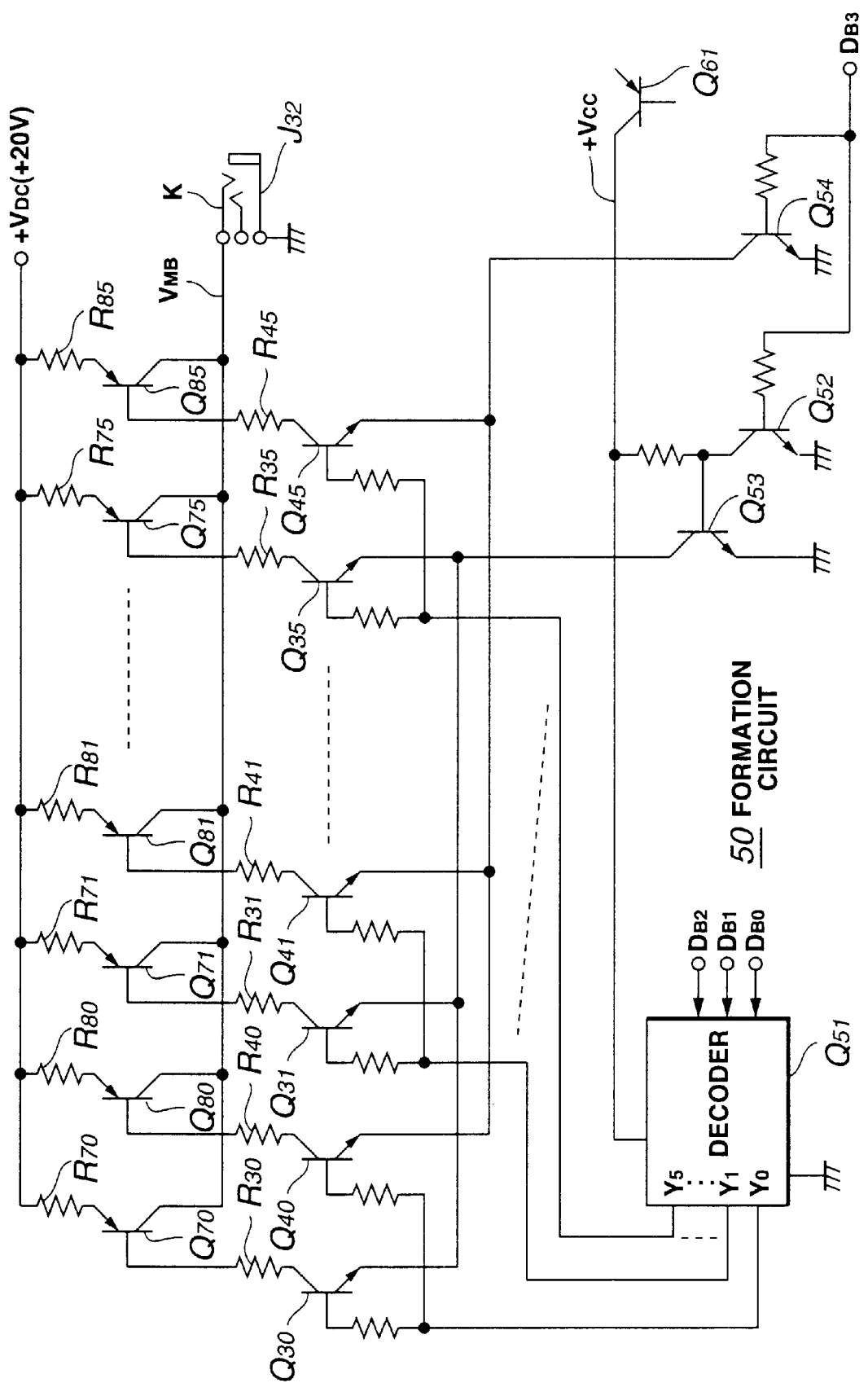
FIG. 7 is a schematic circuit diagram-of still another part of the embodiment of FIG. 1.

FIG. 7 shows a typical configuration of the tuning voltage forming circuit 50. The band data DB2 through DB from the microcomputer 41 are fed to decoder IC (Q51) and decoded into data Y0 through Y5 that vary as shown in the rightmost column of the chart in FIG. 5, which data Y0 through Y5 are then supplied respectively to the base of the transistors (Q30, Q40) through (Q35, Q45).

The transistors Q30 through Q35 are switching transistors for forming the tuning voltages of the respective meter bands VMB in the L band, whereas the transistors Q40 through Q45 are switching transistors for forming the tuning voltages of the respective meter bands VMB in the H band.

Then, a DC voltage VDC that may typically be equal to +20V is formed for the tuning voltages VMB by a DC-DC converter circuit (not shown) and resistors R70 through R75, intermediary points between the emitters and the bases of the respective switching transistors Q70 through Q75 and resistors R30 through R35 are respectively connected between the voltage line of the DC voltage VDC and the collectors of the transistors Q30 through Q35 as shown in FIG. 7. The emitters of the transistors Q30 through Q35 are connected to the collector of transistor Q53, whose emitter is connected to a grounding line.

Then, resistors R80 through R85 are connected in series between the voltage line of voltage VDC and the collectors of respective transistors Q40 through Q45 and resistors R40 through 45 are connected in series respectively between the emitters and the bases of transistors Q80 through Q85. The emitters of the transistors Q40 through Q45 are connected to the collector of transistor Q54, whose emitter is connected to a grounding line.

Then, the band data DB3 is supplied from the microcomputer 41 to the base of the transistor Q54 and also to the base of the transistor Q53 by way of inverting transistor Q52. As described hereinafter, as tuning voltage VMB is output to the collectors of the transistors Q70 through Q75 and Q80 through Q85, the collectors are connected to the contact K of the jack J32.

Note that the DC voltage VDC and the DC-DC converter circuit for forming the voltage are respectively the voltage required for the variable capacity diodes of the front end circuits 33A, 33F and the formation circuit thereof.

With the above described configuration, when the band data DB3 through DB are used for one of the meter bands of the L band, e.g., the 120 meter band, all the data DB2 through DB are equal to 0 as shown in FIG. 5 so that only the data Y0 is made equal to "1" out of the output data Y0 through Y5 of the IC (Q51) while all the other data are equal to "0".

Therefore, although the transistors Q30, Q40 to which the data Y0 is supplied might well be turned on, actually only the transistor Q30 is turned on because DB3="0" and the transistor Q54 is held off to keep the transistor Q53 also off. Additionally, since the data Y1 through Y5 are all equal to "0", all the remaining transistors Q31 through Q35, Q41 through Q45 are held off.

If the transistor Q30 is on, the transistor Q70 is turned on accordingly so that the voltage VDC is divided by the resistors R70, R30 and the voltage obtained by the division is applied to the contact K of the jack J32 by way of the transistor Q70.

If the band data DB3 through DB0 matches to one of the meter bands of the H band, e.g., the 31 meter band, all the data DB2 through DB0 are equal to "0" and hence only the data Y0 of the output data Y0 through Y5 of the IC (Q51) is equal to "1", while all the remaining data Y1 through Y5 are equal to "0".

Then, although the transistors Q30, Q40 to which the data Y0 is supplied might well be turned on, actually only the transistor Q40 is turned on because. DB3="1" and the transistor Q53 is held off to keep the transistor Q54 also off. Additionally, since the data Y1 through Y5 are all equal to "0", all the remaining transistors Q31 through Q35, Q41 through Q45 are held off.

If the transistor Q40 is on, the transistor Q80 is turned on accordingly so that the voltage VDC is divided by the resistors R80, R40 and the voltage obtained by the division is applied to the contact K of the jack J32 by way of the transistor Q80.

The above description also applies to any other meter band so that only the transistor corresponding to the meter band is turned on out of the transistors Q31 through Q35, Q41 through Q45 and the voltage VDC is divided by the resistors connected to the transistor so that the voltage obtained by the division is applied to the contact K of the jack J32.

Therefore, by selecting the ratio to be obtained by dividing the voltage VDC in advance, the voltage obtained by the voltage division can be made equal to the tuning voltage VMB required for the selected meter band and supplied to the contact K of the jack J32 as correct tuning voltage VMB.

With the above arrangement of the forming circuit 50, the tuning voltage VMB can always be made to match the band data DB3 through DB0.

Other Arrangements

Figure 8:
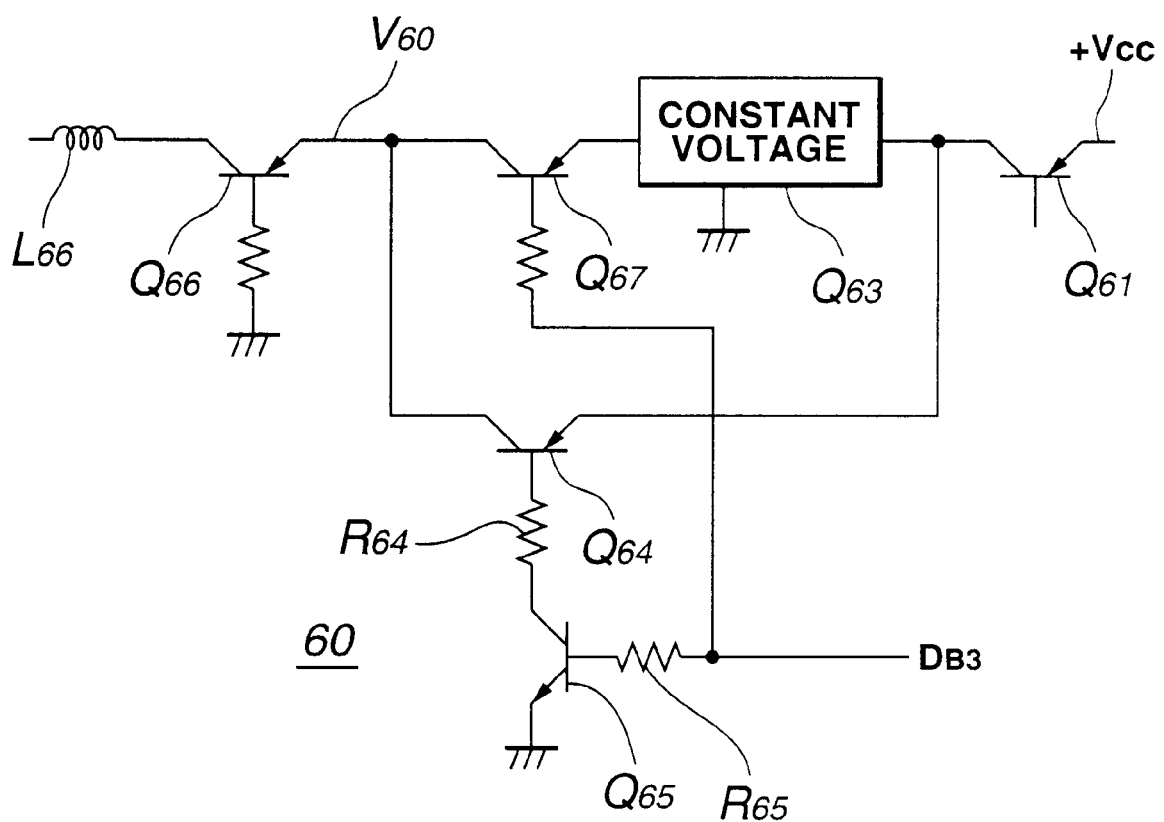
FIG. 8 is a schematic circuit diagram of still another part of the embodiment of FIG. 1.

FIG. 8 shows another arrangement for the voltage switching circuit 60. With this arrangement, the band data DB3 from the microcomputer 41 is made equal to "0" in the L band. However, since the transistor Q67 is turned on when DB3="0", the output voltage of the constant voltage supplying IC (Q63) is taken out through the transistor Q67. On the other hand, since the transistor Q65 is turned off to turn off the transistor Q64 when DB3="0", the voltage +VCC from the transistor Q61 is not taken out through the transistor Q64. Thus, the output voltage V60 of the switching circuit 60 is substantially equal to the output voltage (=1.5V) of the IC (Q63) when DB3="0".

However, DB3 is equal to "1" in the H band and the transistor Q67 is turned off so that the output voltage of the constant voltage supplying IC (Q63) is not taken out by way of the transistor Q67. When, on the other hand, DB3 ="1", the transistor Q65 is turned on to turn on the Q64 so that the voltage +VCC of the transistor Q61 is taken out through the transistor Q64. Thus, the output voltage V60 of the switching circuit 60 is substantially equal to the output voltage (=2V) of the transistor Q64 when DB3 ="1".

Thus, the circuit 60 can output the voltage V60 that is switched one to the other or vice versa as a function of the band data DB3.

Figure 9:
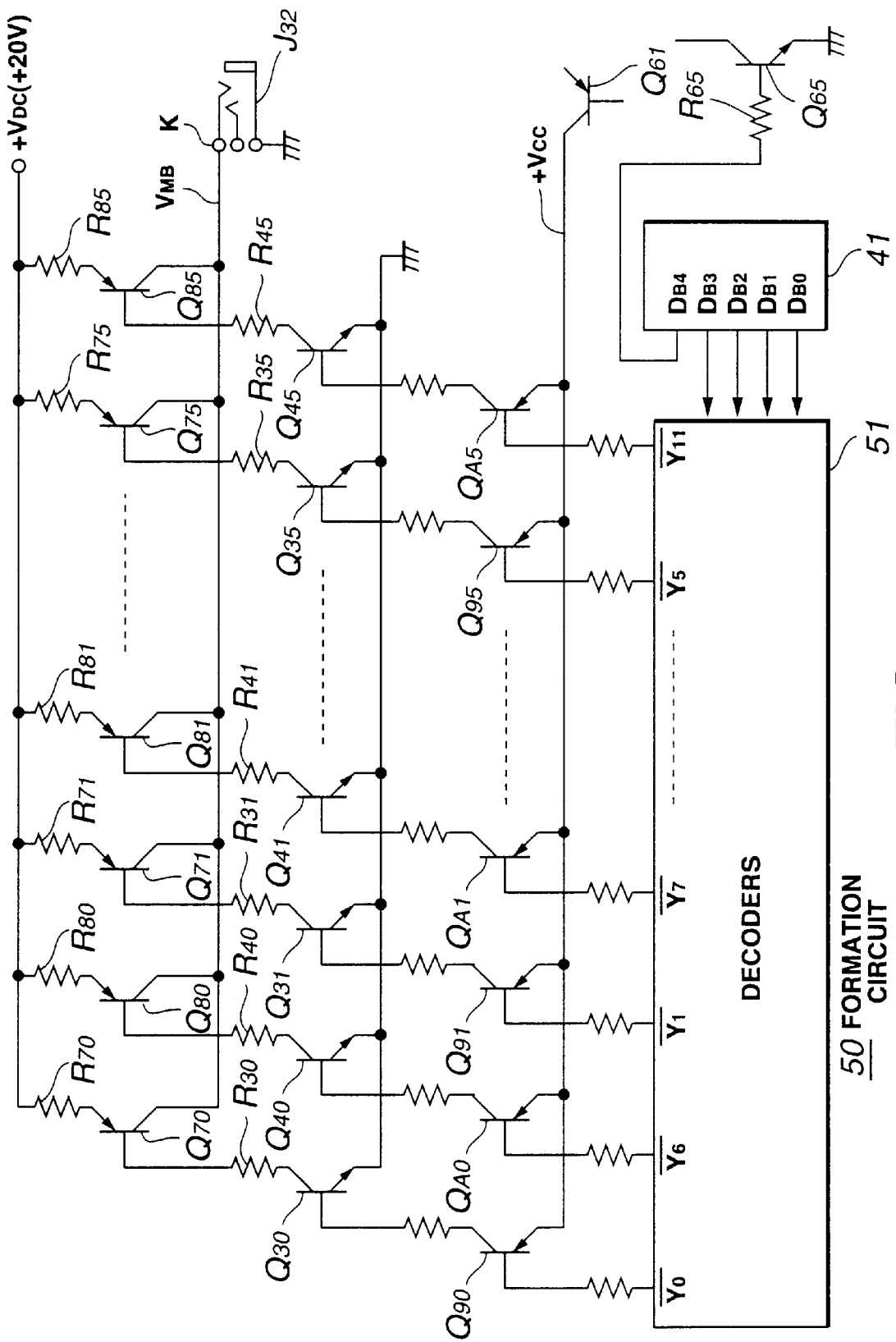
FIG. 9 is a schematic circuit diagram of still another part of the embodiment of FIG. 1.

FIG. 9 is another schematic circuit diagram that can be used for the formation circuit 50 for forming a tuning voltage VMB for the purpose of the invention. In this arrangement, 5-bit band data DB4 through DB that vary as a function of the meter band to be used for signal reception as shown in FIG. 10 are taken out from the microcomputer 41. Then, the data DB3 through DB0 are fed to decoder circuit 51 prepared typically by combining four decoders, which decode the data to produce data $\overline{Y0}$ through $\overline{Y11}$ ($\overline{Y}$ denotes negation of Y).

Then, out of the data $\overline{Y0}$ through $\overline{Y11}$, the data $\overline{Y0}$ through $\overline{Y5}$ are fed to the bases of transistors Q90 through Q95, while the data $\overline{Y6}$ through $\overline{Y11}$ are fed to the bases of transistors QA0 through QA5. The emitters of the transistors Q90 through Q95, QA0 through QA5 are connected to the collector of the transistor Q61, whereas the collectors of the transistors Q90 through Q95, QA0 through QA5 are connected respectively to the bases of the transistors Q30 through Q35, Q40 through Q45.

On the other hand, the emitters of the transistors Q30 through Q35, Q40 through Q45 are connected to the grounding line and all the other terminals of those transistors are connected as in the formation circuit 50 of FIG. 7. Additionally, the band data DB4 from the microcomputer 41 is fed to the base of the transistor Q65.

Thus, when the band data DB3 through DB0 match the 120 meter band, for instance, all the data DB3 through DB0 are equal to "0" as shown in FIG. 10 so that only the data Y0 is made equal to "0" out of the output data $\overline{Y1}$ through $\overline{Y11}$ of the decoder circuit 51 and all the remaining data $\overline{Y1}$ through $\overline{Y11}$ are made equal to "1".

Therefore, the transistor Q90 to which the data $\overline{Y0}$ is supplied is turned on to turn on the transistor Q30, whereas all the transistors Q91 through Q95, QA0 through QA5 to which the data $\overline{Y1}$ through $\overline{Y11}$ are fed are turned off. Sine the transistor Q70 is turned off when the transistor Q30 is turned on, the voltage VDC is divided by the resistors R70, R30 and the voltage obtained by the division is output to the contact K of the jack J32 by way of the transistor Q70.

The above description also applies to any other meter band so that only the transistor corresponding to the meter band is turned on out of the transistors Q30 through Q35, Q41 through Q45 and the voltage VDC is divided by the resistors connected to the transistor so that the voltage obtained by the division is applied to the contact K of the jack J32.

Therefore, by selecting the ratio to be obtained by dividing the voltage VDC in advance, the voltage obtained by the voltage division can be made equal to the tuning voltage VMB required for the selected meter band and supplied to the contact K of the jack J32 as correct tuning voltage VMB.

With the above arrangement of the forming circuit 50 of FIG. 9, the tuning voltage VMB can always be made to match the band data DB3 through DB0.

Figure 11:
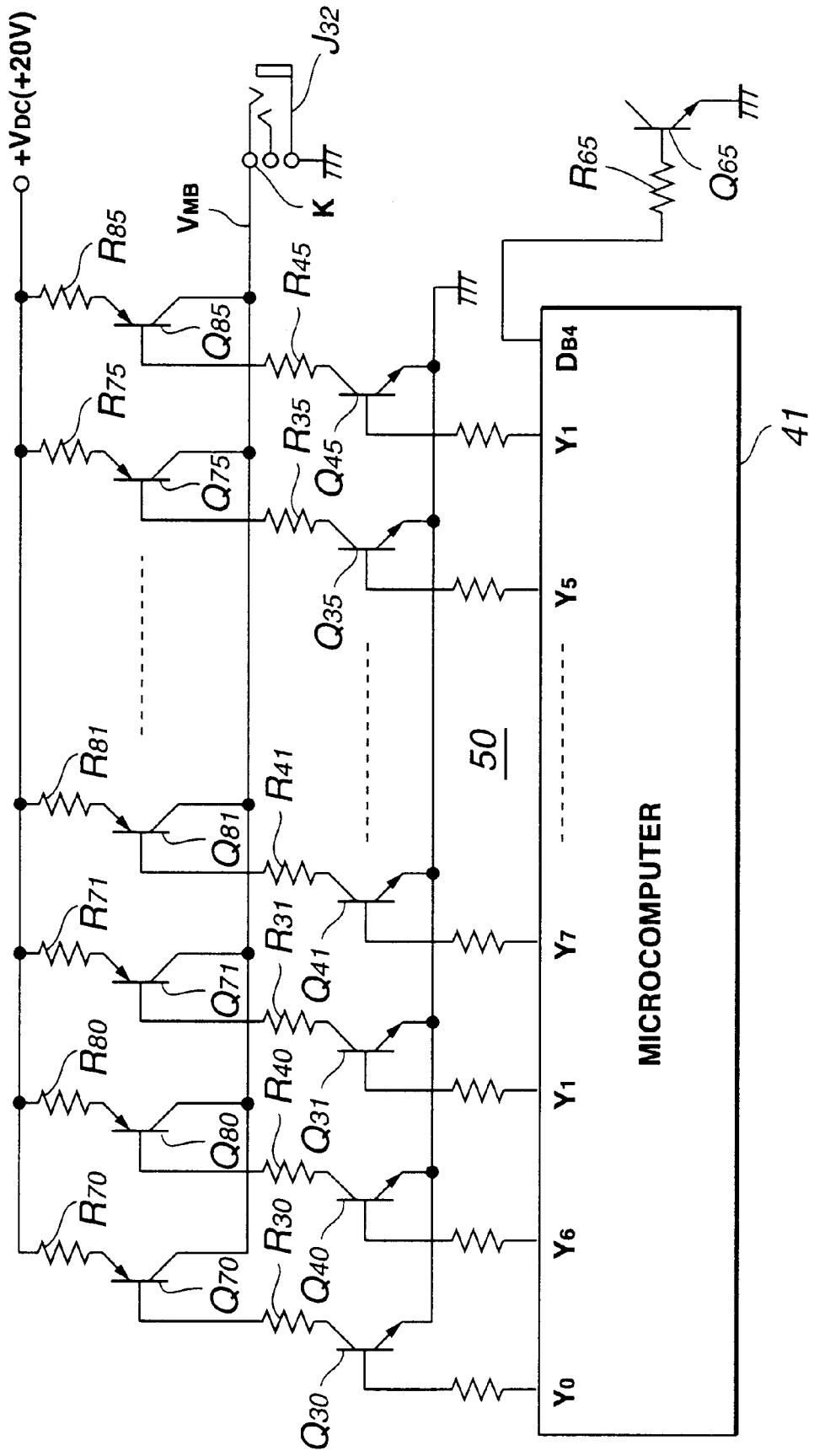
FIG. 11 is a schematic circuit diagram of still another part of the embodiment of FIG. 1.

FIG. 11 is another schematic circuit diagram that can be used for the formation circuit 50 for forming a tuning voltage VMB for the purpose of the invention. In this arrangement, the microcomputer 41 has spare output ports to which data Y0 through Y11 that are inverted relative to the data $\overline{Y0}$ through $\overline{Y11}$ of FIG. 10 are taken out and fed to the bases of the transistors Q30 through Q35, Q40 through Q45. Thus, a correct tuning voltage VMB can be obtained as in the case of FIG. 9.

Figure 12:
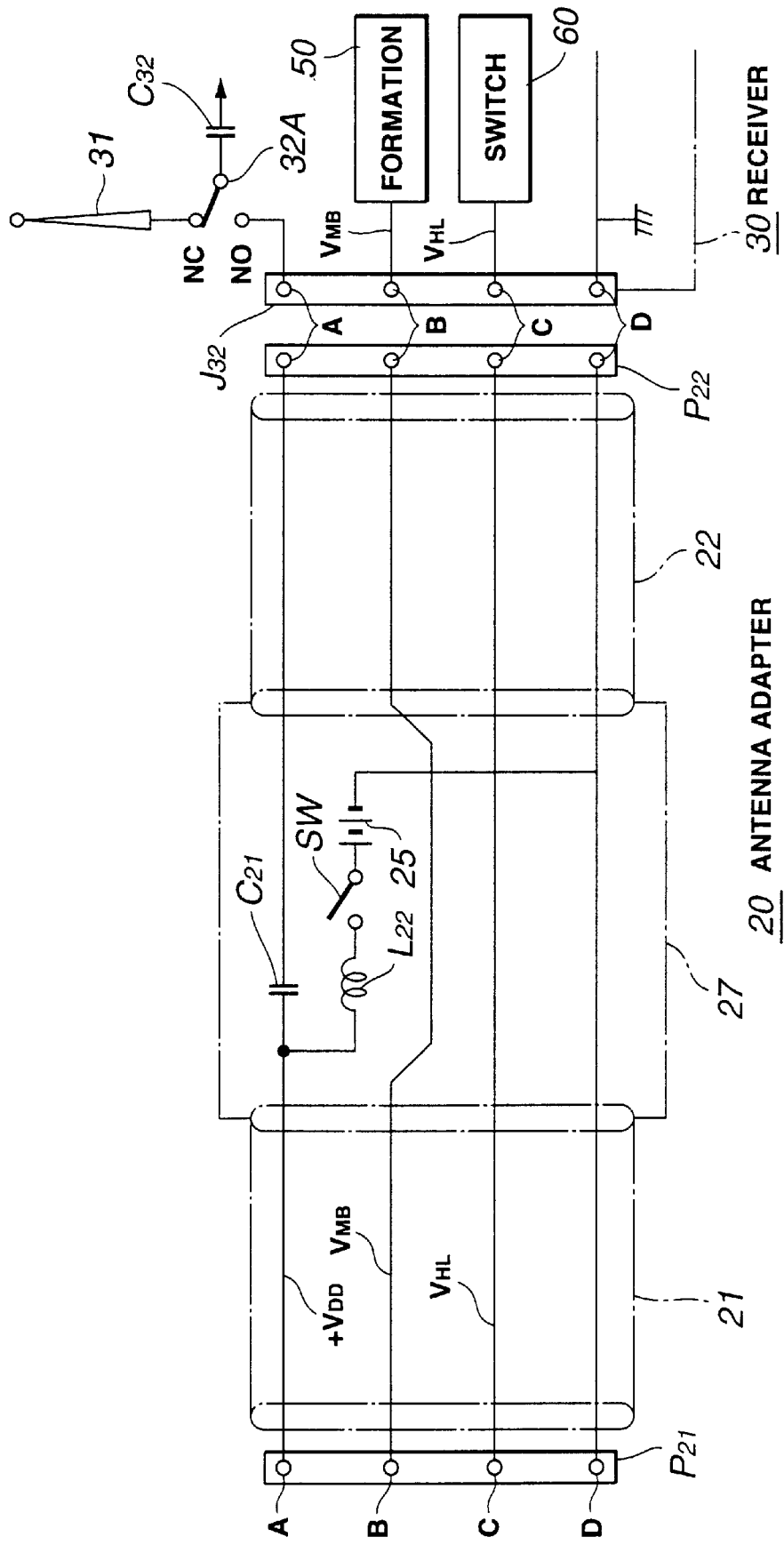
FIG. 12 is a schematic circuit diagram of still another part of the embodiment of FIG. 1.

FIG. 12 is a schematic circuit diagram of a simplified antenna adaptor 20. In this arrangement, the jack J32 of the receiver 30 is made to have four contacts A through D, of which the contact A is connected to the contact N-channel of switch 32A interlocked with the jack J32 and the tuning voltage VMB from the formation circuit 50 is applied to the contact B. On the other hand, the meter band switching voltage VHL is applied from the switch 60 to the contact C of the jack J32 and the contact D is connected to a grounding line.

In the case of the antenna adaptor 20 of FIG. 11, the plug 22 is made to have four contacts A through D to correspond to the jack J32, of which the contact A is connected to the contact A of the plug 21 by way of the line of cable 22→capacitor C21→cable 21, while the contacts B through D of the plug P22 are connected respectively to the contacts B through D of the plug P21 by way of the respective lines of cables 22→cables 21.

Additionally, battery 25 is connected to the plug P21 of the capacitor C21 by way of power supply switch SW and high frequency choke coil L22.

Thus, as the power supply switch SW is turned on, the voltage of the battery 25 is applied to the antenna module 10 by way of the voltage line of switch SW→coil L22→cable 21→contact A of plug P21 to bring the antenna module 10 into an active state. Under this condition, as the tuning voltage VMB and the meter band switching voltage VHL produced from the receiver 30 are applied to the antenna module 10 by way of the voltage line of jack J32→plug P22→cable 22→cable 21→plug P21 so that the meter band containing the frequency selected by the receiver 30 is also selected by the antenna module 10 and signals of the selected meter band will be received.

Then, the received signals are fed to the front end circuit 33A of by way of the signal line of contact A of plug P21→cable 21→capacitor C21→cable 22→contact of plug P22→contact A of jack J32→switch 32A→capacitor C32. Thus, the broadcast of any of the frequencies of any of the selected meter band can be selectively listened to.

The decoding IC (Q51) and the decoder circuit 51 may alternatively be made to comprise series input/parallel output type shift registers. Additionally, the plug P21 may alternatively be prepared by combining a stereo mini-plug and a monaural mini-plug and the jack J11 may be prepared by combining a stereo mini-jack and a monaural mini-jack in a corresponding manner. Still alternatively, manual switches may be used for the switches 32A, 32B.

What is claimed is:

1. A shortwave receiver adapted to be used with an antenna module having:
   a loop antenna;
   an auxiliary tuning coil;
   a variable capacity diode connected in parallel with the loop antenna to form a tuning circuit for high frequency tuning operations; and
   a high frequency amplifier for receiving a signal selected by said tuning circuit, said shortwave receiver comprising:

a receiving circuit for receiving a shortwave broadcast signal output from said antenna module;

a formation circuit for forming a tuning voltage to be applied to said variable capacity diode; and a jack, wherein when using said antenna module, said formation circuit is controlled corresponding to a reception frequency of said receiving circuit so as to modify said tuning voltage to accommodate a reception band of the shortwave broadcast signal received by said receiving circuit and cause said tuning voltage to be output from said jack and applied to said variable capacity diode; and an antenna adapter for detecting a band selecting voltage of said shortwave receiver and producing a control voltage therefrom fed to said antenna module for connecting said auxiliary tuning coil to said loop antenna and variable capacity diode depending upon a selected band.

2. The shortwave receiver according to claim 1, wherein said receiving circuit is adapted to a superheterodyne system and to a PLL synthesizer system and includes a front end circuit for converting the received shortwave signal into an intermediate frequency signal for output.

3. The shortwave receiver according to claim 1, wherein said antenna module further has a switching element for connecting said auxiliary coil to said tuning circuit for high frequency reception; and said formation circuit of said shortwave receiver comprises:

means for forming a reception band switching voltage for selecting the reception band of the shortwave broadcast received by said receiving circuit;

said reception band switching voltage being output from said jack and fed to said antenna adapter to control said switching element in response to said reception band switching voltage.

4. A shortwave receiver, comprising: an antenna module having:

a loop antenna;

an auxiliary tuning coil;

a variable capacity diode connected in parallel with the loop antenna to form a tuning circuit for high frequency tuning operations; and a high frequency amplifier for receiving a signal selected by said tuning circuit;

a receiver unit having:

a receiving circuit for receiving a shortwave broadcast signal output from said antenna module;

a formation circuit for forming a tuning voltage to be applied to said variable capacity diode; and a jack, wherein said antenna module further includes:

a battery for supplying power to said high frequency amplifier;

switching means for turning on/off an output voltage of said battery;

a plug adapted to be plugged into said jack; and a cable connected to said plug, wherein said formation circuit of said receiver unit is controlled corresponding to a reception frequency of said receiving circuit so as to modify said tuning voltage to accommodate a reception band of the shortwave broadcast signal received by said receiving circuit, said switching means is turned on to apply the output voltage of said battery to said high frequency amplifier as operating voltage, said tuning voltage is applied from said jack to said variable capacity diode by way of said plug and said cable, and the received signal output from said antenna module is supplied to said reception circuit by way of said cable and said plug; and an antenna adapter for detecting a band selecting voltage of said shortwave receiver and producing a control voltage therefrom fed to said antenna module for connecting said auxiliary tuning coil to said loop antenna and variable capacity diode depending upon a selected band.

5. The antenna adaptor according to claim 4, wherein said switching means is automatically turned off when said plug is not plugged into said jack.

6. The antenna adaptor according to claim 4, wherein said switching means is automatically turned off when a power source of said shortwave receiver is off even when the plug is plugged into said jack.

* * * * *